(12) United States Patent
Yararbas et al.

(10) Patent No.: US 11,709,844 B2
(45) Date of Patent: Jul. 25, 2023

(54) COMPUTERIZED SMART INVENTORY SEARCH METHODS AND SYSTEMS USING CLASSIFICATION AND TAGGING

(71) Applicant: Volvo Car Corporation, Gothenburg (SE)

(72) Inventors: Aykut Yararbas, Cupertino, CA (US); Jon Seneger, Boulder Creek, CA (US); Sohini Roy Chowdhury, Santa Clara, CA (US); Joakim Soderberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 335 days.

(21) Appl. No.: 17/017,784

(22) Filed: Sep. 11, 2020

(65) Prior Publication Data

US 2022/0083557 A1 Mar. 17, 2022

(51) Int. Cl.

| G06F 16/2457 | (2019.01) |
|---|---|
| G06N 20/00 | (2019.01) |
| G06F 16/9535 | (2019.01) |
| G06F 16/248 | (2019.01) |
| G06F 40/284 | (2020.01) |
| G06F 40/30 | (2020.01) |
| G06Q 30/0601 | (2023.01) |

(52) U.S. Cl.
CPC ...... *G06F 16/24575* (2019.01); *G06F 16/248* (2019.01); *G06F 16/9535* (2019.01); *G06F 40/284* (2020.01); *G06F 40/30* (2020.01); *G06N 20/00* (2019.01); *G06Q 30/0627* (2013.01)

(58) Field of Classification Search
CPC ............. G06F 16/24575; G06F 16/248; G06F 16/9535; G06F 40/284; G06F 40/30; G06F 16/907; G06F 16/95; G06N 20/00; G06Q 30/0627
USPC ....... 707/706, 708, 713, 736, 737, 740, 759, 707/769
See application file for complete search history.

(56) References Cited

U.S. PATENT DOCUMENTS

| 8,166,036 B2 | 4/2012 | Chowdhury et al. |
| 8,768,954 B2 | 7/2014 | Pieper |

(Continued)

OTHER PUBLICATIONS

Jan. 24, 2022 Extended European Search Report issued International Application No. 21195806.

*Primary Examiner* — Phong H Nguyen
(74) *Attorney, Agent, or Firm* — Clements Bernard Walker; Christopher L. Bernard

(57) ABSTRACT

A method and system operable for: receiving a search query including search terms; using a machine learning module, selecting features of the search terms and mapping an association between the search terms and a domain object, thereby generating a domain object classification; tagging the domain object with the domain object classification; and using the domain object tagged with the domain object classification to conduct a subsequent search. Conducting the subsequent search includes: receiving a subsequent search query including subsequent search terms; tokenizing the subsequent search terms; finding permutations of the tokenized subsequent search terms; matching the subsequent search terms to the domain object tagged with the domain object classification; and displaying subsequent search results via a user interface.

17 Claims, 8 Drawing Sheets

(56) References Cited

U.S. PATENT DOCUMENTS

| | | | |
|---|---|---|---|
| 8,843,470 B2* | 9/2014 | Li | G06F 16/3331 |
| | | | 707/708 |
| 9,542,473 B2 | 1/2017 | Hanses et al. | |
| 10,223,453 B2 | 3/2019 | Levy | |
| 2009/0210417 A1* | 8/2009 | Bennett | G06F 16/951 |
| | | | 707/999.005 |
| 2012/0005022 A1* | 1/2012 | Lee | G06Q 30/0275 |
| | | | 705/14.54 |
| 2012/0290553 A1* | 11/2012 | England | G06Q 30/0282 |
| | | | 707/706 |
| 2014/0250119 A1* | 9/2014 | Bhattiprolu | G06F 16/256 |
| | | | 707/728 |
| 2015/0286747 A1* | 10/2015 | Anastasakos | G06F 40/40 |
| | | | 707/776 |
| 2019/0082988 A1* | 3/2019 | Datta | A61B 5/366 |
| 2020/0065712 A1* | 2/2020 | Wang | G06N 20/20 |
| 2020/0104419 A1* | 4/2020 | Chandrasekaran | |
| | | | G06F 16/9532 |

* cited by examiner

US 11,709,844 B2

COMPUTERIZED SMART INVENTORY SEARCH METHODS AND SYSTEMS USING CLASSIFICATION AND TAGGING

TECHNICAL FIELD

The present disclosure relates generally to the automotive and computerized search fields. More particularly, the present disclosure relates to computerized smart inventory search methods and systems using classification and tagging.

BACKGROUND

A contemporary full-text search is a classification tool that find a best match based on entered search terms. When domain data does not have any match for the entered search terms, or only matches a subset of the entered search terms, the search results provide only a nearest best match, and not an actual best match. Any domain data subject to full-text search is prone to this issue and it cannot be solved without tagging and updating tags associated with the domain data with any possible search terms. Thus, it is desirable that a subset of the entered search terms be created that does not yet exist.

This background is provided as an illustrative contextual environment only. It will be readily apparent to those of ordinary skill in the art that the systems and methods of the present disclosure may be implemented in other contextual environments as well.

SUMMARY

In one illustrative embodiment, the present disclosure provides a method, including: receiving a search query including search terms; using a machine learning module, selecting features of the search terms and mapping an association between the search terms and a domain object, thereby generating a domain object classification; tagging the domain object with the domain object classification; and using the domain object tagged with the domain object classification to conduct a subsequent search. Conducting the subsequent search includes: receiving a subsequent search query including subsequent search terms; tokenizing the subsequent search terms; finding permutations of the tokenized subsequent search terms; matching the subsequent search terms to the domain object tagged with the domain object classification; and displaying subsequent search results via a user interface, wherein subsequent search terms that match a defined association with the domain object tagged with the domain object classification are included in a search query string to which subsequent search terms that do not match a defined association with the domain object tagged with the domain object classification are appended.

In another illustrative embodiment, the present disclosure provides a non-transitory computer-readable medium including instructions stored in a memory and executed by a processor to carry out the classification, tagging, and search steps including: receiving a search query including search terms; using a machine learning module, selecting features of the search terms and mapping an association between the search terms and a domain object, thereby generating a domain object classification; tagging the domain object with the domain object classification; and using the domain object tagged with the domain object classification to conduct a subsequent search. Conducting the subsequent search includes: receiving a subsequent search query including subsequent search terms; tokenizing the subsequent search terms; finding permutations of the tokenized subsequent search terms; matching the subsequent search terms to the domain object tagged with the domain object classification; and displaying subsequent search results via a user interface, wherein subsequent search terms that match a defined association with the domain object tagged with the domain object classification are included in a search query string to which subsequent search terms that do not match a defined association with the domain object tagged with the domain object classification are appended.

In a further illustrative embodiment, the present disclosure provides a system, including: memory storing instructions executed by a processor for receiving a search query including search terms; a machine learning module operable for selecting features of the search terms and mapping an association between the search terms and a domain object, thereby generating a domain object classification, and tagging the domain object with the domain object classification; and a search engine operable for using the domain object tagged with the domain object classification to conduct a subsequent search. Conducting the subsequent search includes: receiving a subsequent search query including subsequent search terms; tokenizing the subsequent search terms; finding permutations of the tokenized subsequent search terms; matching the subsequent search terms to the domain object tagged with the domain object classification; and displaying subsequent search results via a user interface, wherein subsequent search terms that match a defined association with the domain object tagged with the domain object classification are included in a search query string to which subsequent search terms that do not match a defined association with the domain object tagged with the domain object classification are appended.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Figure 1:
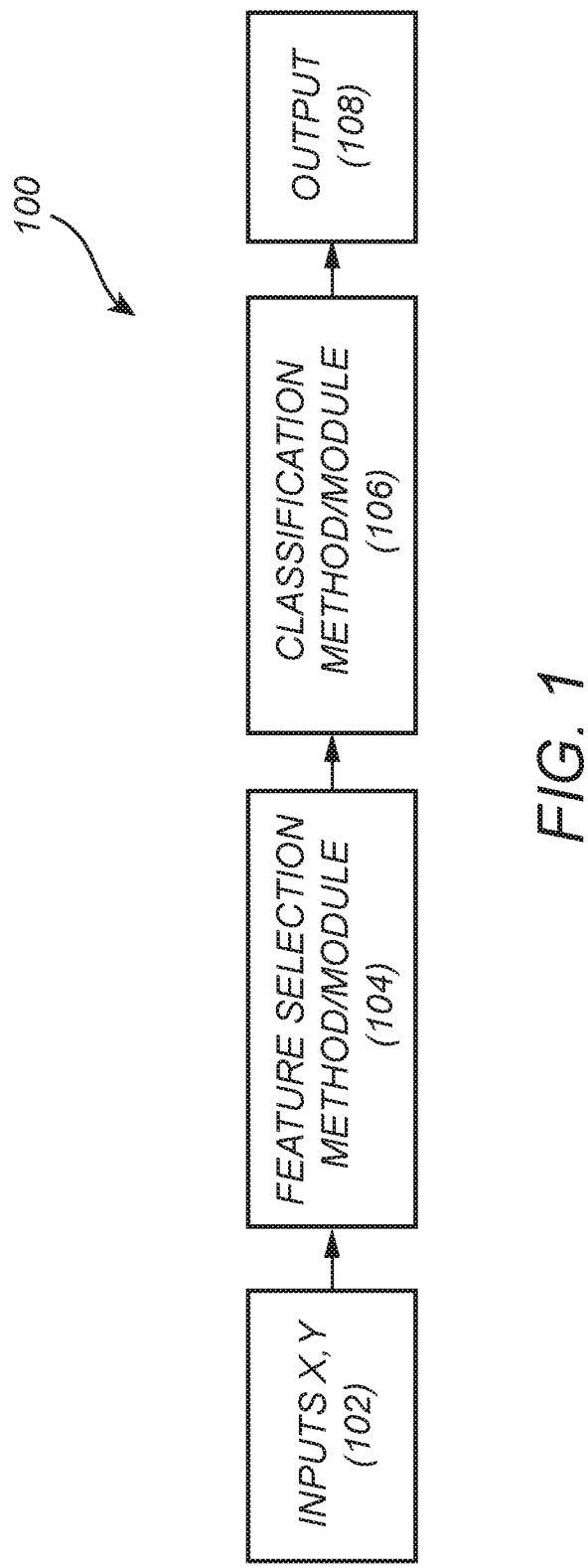
FIG. 1 is a schematic diagram of one illustrative embodiment of the classification system/method of the present disclosure.

As alluded to above, contemporary search engines deliver users sets of results based on their queries. A user makes a choice by selecting a result link that redirects them to a domain-specific web page. This query posed to the search engine is captured and the associated journey creates a record representing the user's intent and an understanding of the domain-specific web page. The present disclosure provides three refinements to this process. First, search terms are mapped to domain objects. Second, semantic mappings to the domain ontology are formed. Third, the mapping is used to enable smart inventory searching, such as in a vehicle search and sale context. Data regarding the association/understanding is mined towards the task of classifying domain objects to expose patterns and importance to the query terms. Thus, the solution of the present disclosure creates a subset of the search terms that does not yet exist, enabling enhanced search.

In general, on the search term classification and tagging side, a user enters a query into a search engine, is presented with search results, and selects a given search result. A link directs the user to an appropriate domain-specific web page. On the system side, the search terms and web page information is collected for use. A machine learning (ML) system creates an association between the search terms and the web page and uses this association for classification and tagging such that search results may subsequently be enhanced, as described in greater detail herein below.

On the smart inventory search side, the user again enters a query into a search engine and is directed to a domain-specific web page. The search engine may be a vehicle configurator web page or the like. On the system side, the search terms are tokenized and permutations of the tokenized search terms are found. The system then finds the best matching classifications, using the classifications and tagging generated by the ML system. The system constructs a query using the best matching classifications and any unidentified search terms. A search is thus performed and results are returned and displayed to the user via a user interface (UI). Again, these functionalities are described in greater detail herein below.

In terms of using ML for classification and tagging, domain objects are classified and tagged by entered search terms using ML findings, thus creating a map of associations. These associations map search terms and domain objects, described in a pre-defined table. The associations are used to provide context to provide pretext for undefined query terms. The result is an understanding of the correlation between search terms and domain objects via a set of rules (i.e., weakly supervised learning) based on the taxonomy of domain objects and complex product description-level associations.

The search mechanism then utilizes the associations to find domain objects in an improved search query. Query terms that do not match any defined associations are undefined, unstructured, and not identified specifically as part of a domain, and are used as part of a simple search query string. The domain objects that are identified and linked to a specific association are also used in the simple search query string to enhance the result, and the search response objects.

Referring now specifically to FIG. 1, the classification system 100 of the present disclosure utilizes various inputs 102, including, for example, the search terms (a combination of words), the number of clicks per time period (#clicks), the click-through rate (CTR), and the weight of the search (originating from paid versus free ads). These entries form data, X. A class label, Y, can also be generated corresponding to each product type (e.g., vehicle model—class 1, class 2, etc.).

Using a feature selection algorithm, 104, such as a minimum redundancy, maximum relevance (mRMR) method, the ranks of words and their combinations can be learned to separate one domain object from another, thereby classifying the domain objects. The formula for mRMR is:

$$\max\{D=1/|s|l(x_i,C)\}\min\{1/|s|^2\Sigma l(x_i;x_j)\},$$

where $x_i$ corresponds to each search word, C is a specific class label (from Y), and l represents the information gain in an entropy sense.

A random forest model using a GINI index-based information metric can also be used for feature selection 104. The output 108 after classification 106 is a best combination of words that maximize classification accuracy across models.

Figure 2:
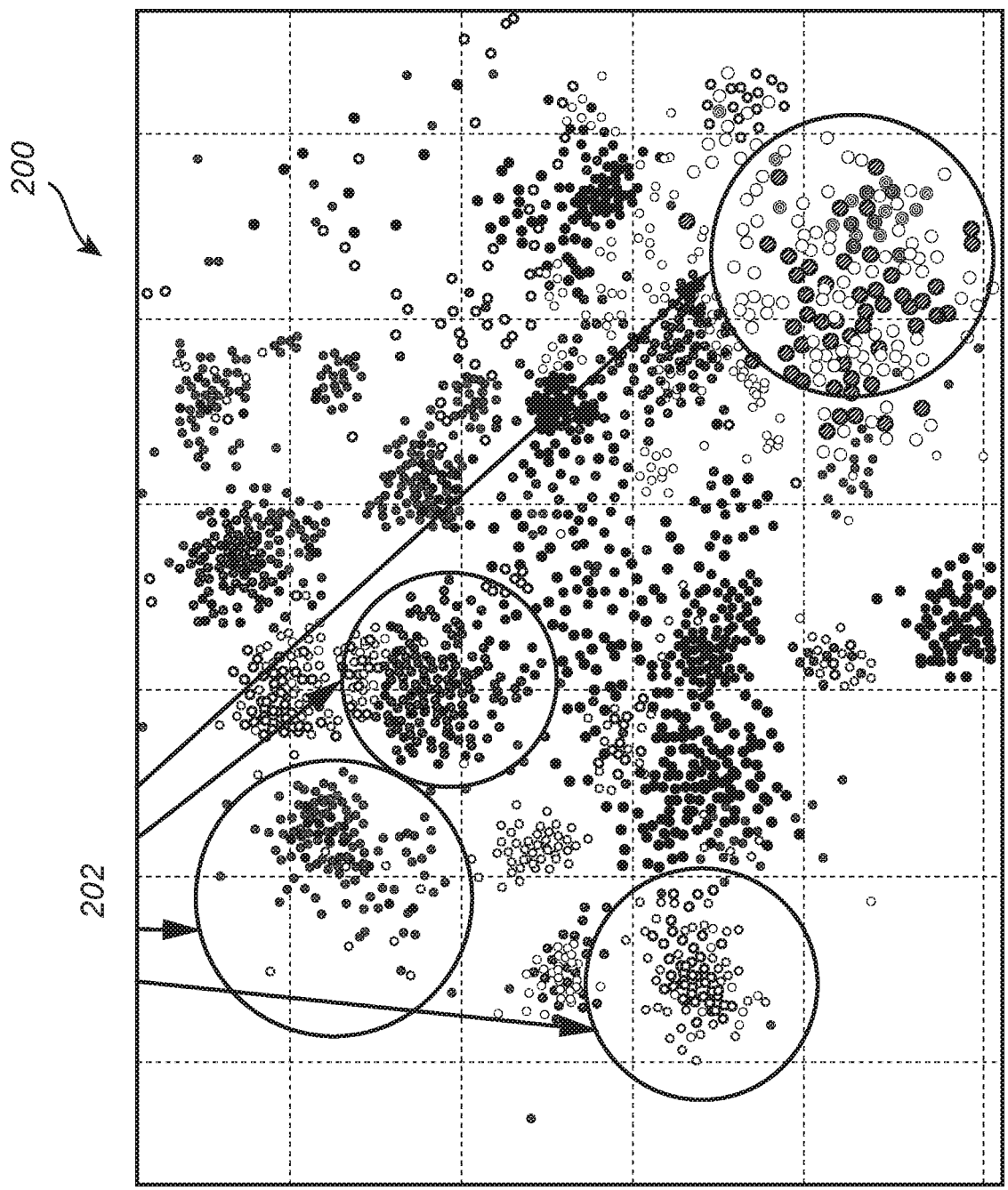
FIG. 2 is a cluster plot illustrating the feature selection function of the classification system/method of FIG. 1.

FIG. 2 is a cluster plot 200 illustrating the feature selection function 104 of the classification system 100 of FIG. 1. Here, the clusters 202 represent products (e.g., vehicle models) and the dimensions/features are word choices. In general, the feature selection function involves one-hot encoded words combinations that are used to search each product projected in sample sub-space. Word combinations (i.e., features) that maximize classification accuracy for products are selected as the optimal set of search words. Once the feature selection function identifies the optimal word combinations, those word combinations are further analyzed for product definition (i.e., zero-shot learning (ZSL)). By way of ZSL example, if the best word combination for a particular vehicle model is "cross country travel interstate mileage," then a domain expert may consider combining these words to generate an automated tag "long distance travel car." If the best word combination for a particular vehicle model is "family 8-seater air bags safe," then a domain expert may consider combining these words to generate an automated tag "family car." ZSL requires minimal manual supervision to generate automated tags for each product configuration.

Here, representation learning is performed in an off-line mode and an on-line mode. In the off-line mode, learning and representing products, their parts, and options is essential for any e-commerce service. As users search for product details on the web, the provide explicit and implicit preferences. An off-line process is utilized to explore such user interactions to support the creation of a product taxonomy and associations of the same to search terms submitted by users online. This process involves: (1) extracting search terms and building a semantic language model by collecting search query-landing web page pairs over a period of time, (2) collecting topics from the language model that represent the most frequently searched topics, (3) adding top candidate topics or mapping already existing concepts in the product taxonomy, and (4) exporting the resulting embeddings to a k-nearest neighbor (k-NN) index for fast run-time lookup.

In the on-line mode, with a product taxonomy that covers both product offerings and reflects users inquiries, personalized content can be provided at run-time by: (1) collecting search keywords for a particular user and computing the corresponding query embedding, (2) if available, looking up semantic nearby topics according to the language model, (3) exploring the product taxonomy to enrich the query with semantic descriptions, and (4) adapting the web content to display relevant information using the semantically enriched query.

Figure 3:
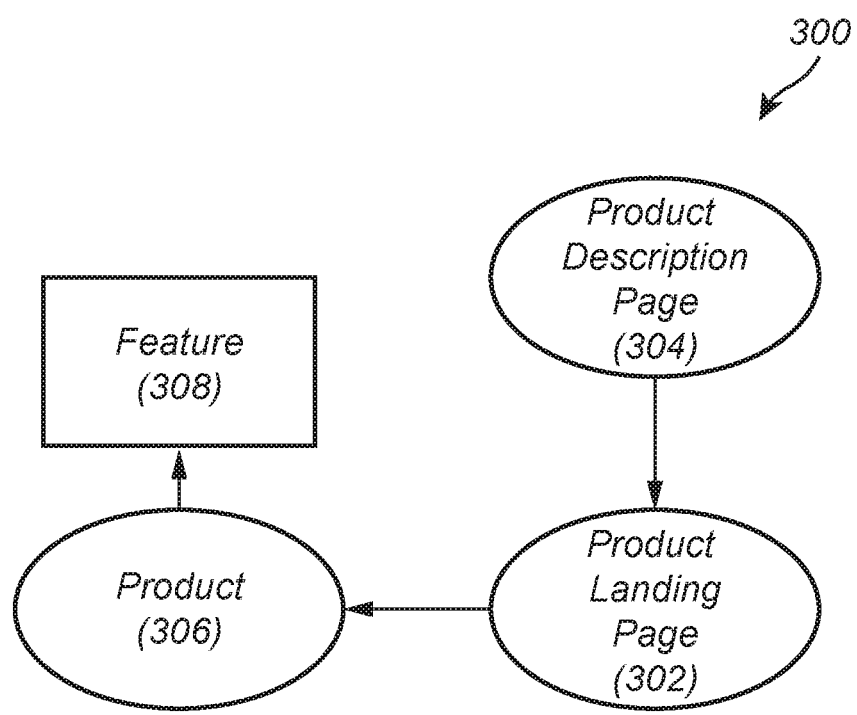
FIG. 3 is a schematic diagram illustrating the operation of an on-line mode of the classification and tagging and smart inventory search aspects of the present disclosure.

FIG. 3 is a schematic diagram illustrating the operation of an on-line mode 300 of the classification and tagging and smart inventory search aspects of the present disclosure. Here, the landing page type 302 is described by a class organized in a domain ontology that is built on domain knowledge. Hence, the relationship of user intent and a domain concept can be described by calculating the posterior probabilities. Knowing the semantic relations of the search object enables presenting the user with relevant information related to the class. FIG. 3 illustrates the semantic relations of a web page category and its topics. Knowing that the user is interested in a specific product 306, which has a specific feature 308, this might indicate that the user is interested in other products 306 with that feature 308, or vice versa, so if the user searches for the feature 308, the product 306 can be presented as a result and content tailored to this choice on the product description page 304.

The methodologies of the present disclosure can be supervised, by learning from sample training data and then testing performance on a test set), or weakly supervised, by learning for automated tags using ZSL as described above.

Figure 4:
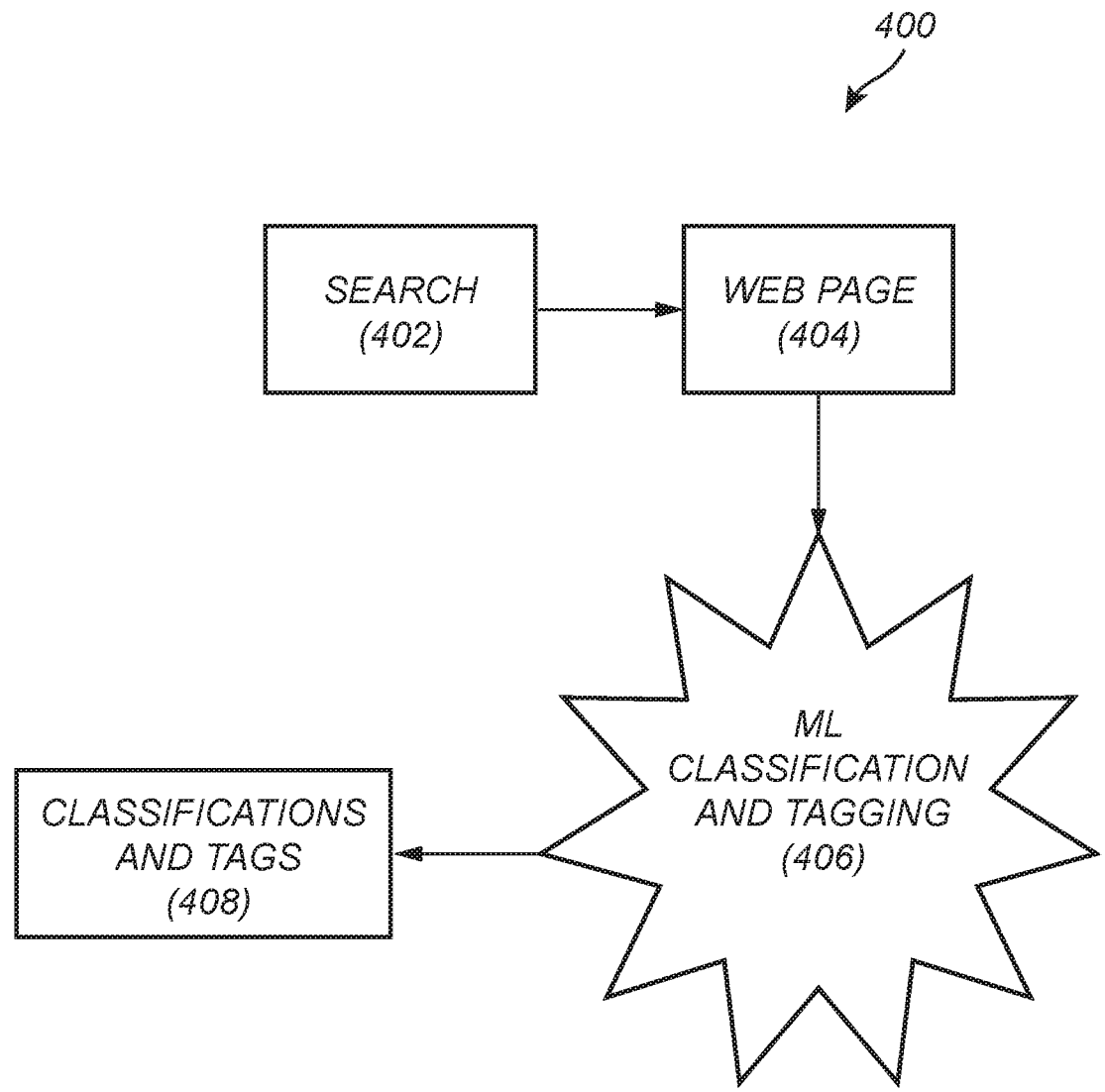
FIG. 4 is a schematic diagram of one illustrative embodiment of the overall classification and tagging system/method of the present disclosure.

FIG. 4 is a schematic diagram of one illustrative embodiment of the overall classification and tagging system/method 400 of the present disclosure. First, a search is performed using a search engine 402, with the user selecting a search result link that directs the user to a domain-specific web page. The search terms and web page information are collected accordingly 404. The ML module 406 then creates the associations described above, classifying and tagging the associated domain objects 408 as described above.

Figure 5:
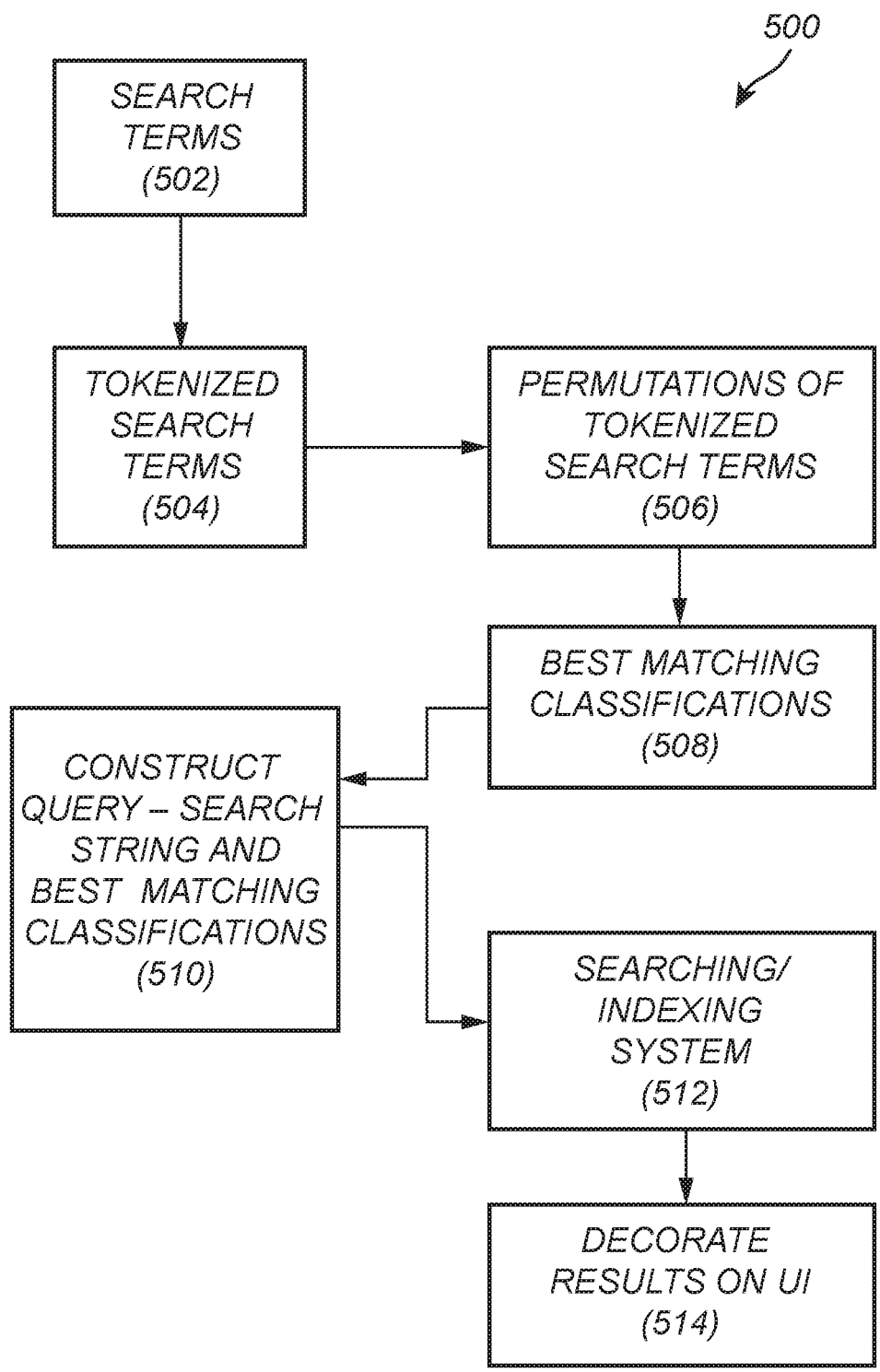
FIG. 5 is a schematic diagram of one illustrative embodiment of the overall smart inventory search system/method of the present disclosure.

FIG. 5 is a schematic diagram of one illustrative embodiment of the overall smart inventory search system/method 500 of the present disclosure. Here, the search terms are first received 502, such as "large family car suv carplay." Next, the search terms are tokenized 504 (large, family, carplay, suv) and permutations of the tokenized search terms are found 506 (large, family, carplay, suv, large family, large family suv). Next, the best matching classifications for the permutations are found 508 (Product 1, Product 2). A query is then constructed based on the search string and the best matching classifications 510, and searched by the searching/indexing system 512. Finally, the search results are displayed, with the search results decorated on the UI 514.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 6:
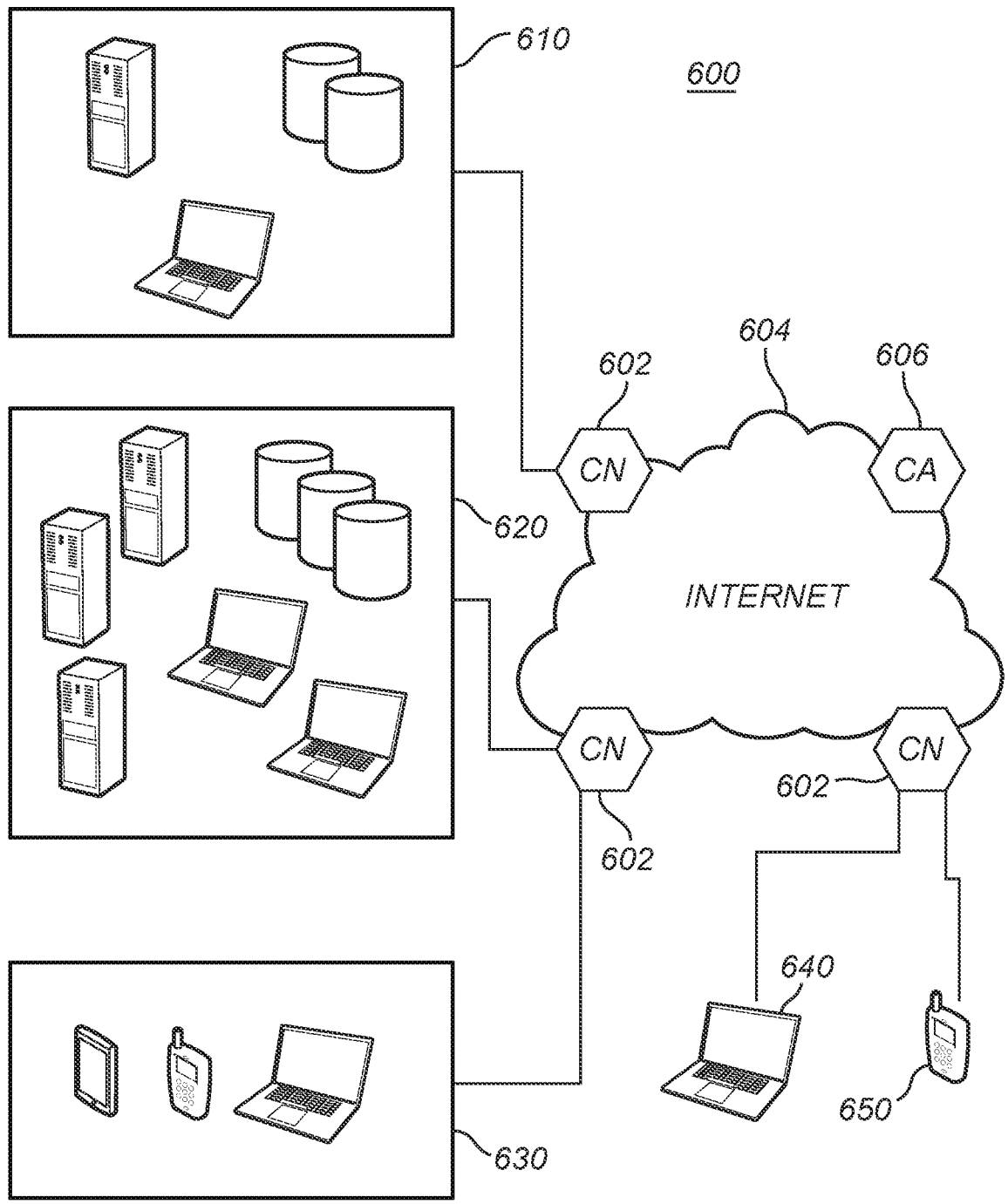
FIG. 6 is a network diagram of a cloud-based system for implementing various cloud-based services of the present disclosure.
Figure 7:
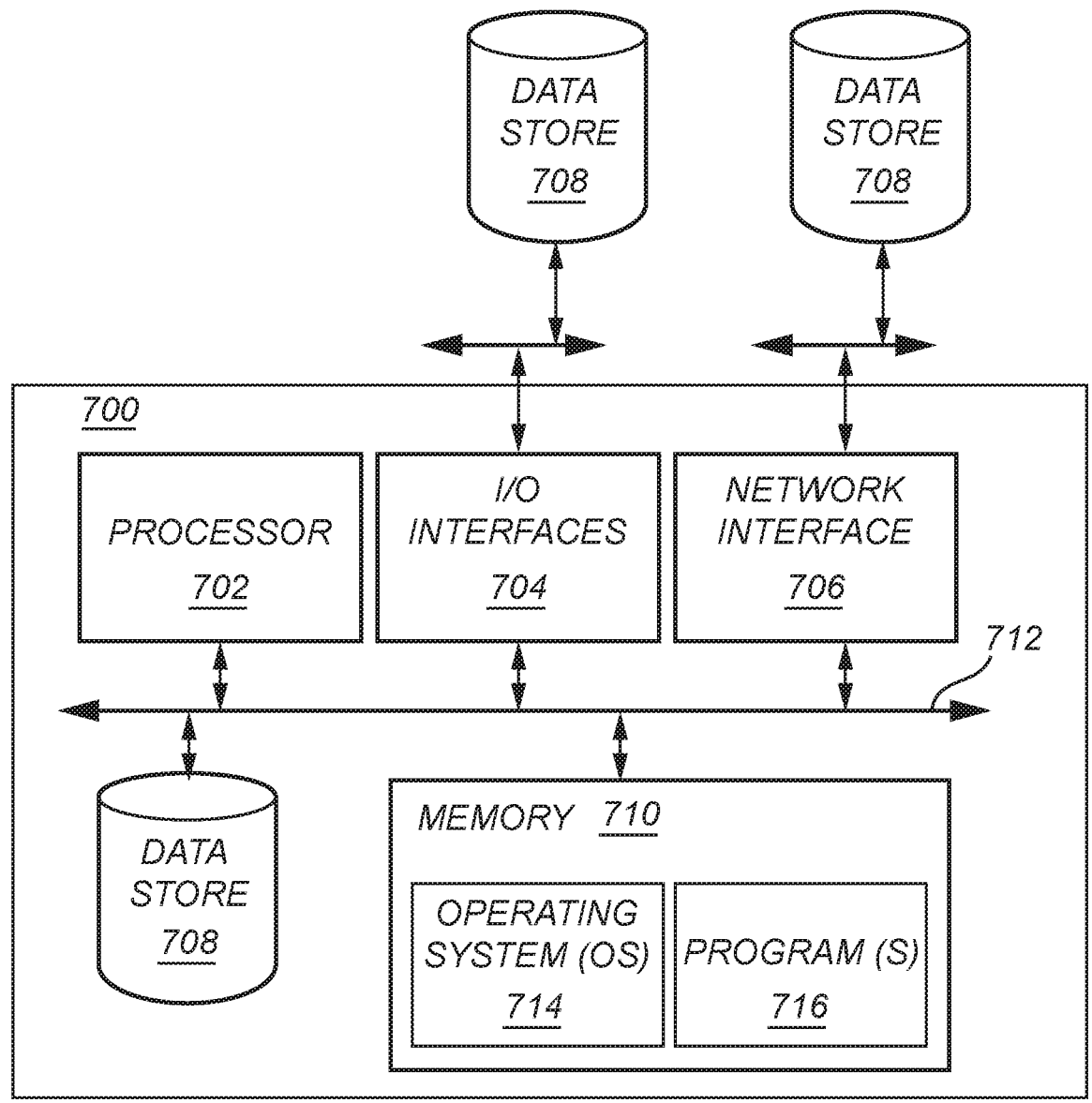
FIG. 7 is a block diagram of a server which may be used in the cloud-based system of FIG. 6 or stand-alone.

FIG. 6 is a network diagram of a cloud-based system 600 for implementing various cloud-based services of the present disclosure. The cloud-based system 600 includes one or more cloud nodes (CNs) 602 communicatively coupled to the Internet 604 or the like. The cloud nodes 602 may be implemented as a server 700 (as illustrated in FIG. 7) or the like and can be geographically diverse from one another, such as located at various data centers around the country or globe. Further, the cloud-based system 600 can include one or more central authority (CA) nodes 606, which similarly can be implemented as the server 700 and be connected to the CNs 602. For illustration purposes, the cloud-based system 600 can connect to a regional office 610, headquarters 620, various employee's homes 630, laptops/desktops 640, and mobile devices 650, each of which can be communicatively coupled to one of the CNs 602. These locations 610, 620, and 630, and devices 640 and 650 are shown for illustrative purposes, and those skilled in the art will recognize there are various access scenarios to the cloud-based system 600, all of which are contemplated herein. The devices 640 and 650 can be so-called road warriors, i.e., users off-site, on-the-road, etc. The cloud-based system 600 can be a private cloud, a public cloud, a combination of a private cloud and a public cloud (hybrid cloud), or the like.

Again, the cloud-based system 600 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 610, 620, and 630 and devices 640 and 650. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 600 is replacing the conventional deployment model. The cloud-based system 600 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 600 is illustrated herein as one example embodiment of a cloud-based system, and those of ordinary skill in the art will recognize the systems and methods described herein are not necessarily limited thereby.

FIG. 7 is a block diagram of a server 700, which may be used in the cloud-based system 600 (FIG. 6), in other systems, or stand-alone. For example, the CNs 602 (FIG. 6) and the central authority nodes 606 (FIG. 6) may be formed as one or more of the servers 700. The server 700 may be a digital computer that, in terms of hardware architecture, generally includes a processor 702, input/output (I/O) interfaces 704, a network interface 706, a data store 708, and memory 710. It should be appreciated by those of ordinary skill in the art that FIG. 7 depicts the server 700 in an oversimplified manner, and a practical embodiment may include additional components and suitably configured processing logic to support known or conventional operating features that are not described in detail herein. The components (702, 704, 706, 708, and 710) are communicatively coupled via a local interface 712. The local interface 712 may be, for example, but is not limited to, one or more buses or other wired or wireless connections, as is known in the art. The local interface 712 may have additional elements, which are omitted for simplicity, such as controllers, buffers (caches), drivers, repeaters, and receivers, among many others, to enable communications. Further, the local interface 712 may include address, control, and/or data connections to enable appropriate communications among the aforementioned components.

The processor 702 is a hardware device for executing software instructions. The processor 702 may be any custom made or commercially available processor, a central processing unit (CPU), an auxiliary processor among several processors associated with the server 700, a semiconductor-based microprocessor (in the form of a microchip or chipset), or generally any device for executing software instructions. When the server 700 is in operation, the processor 702 is configured to execute software stored within the memory 710, to communicate data to and from the memory 710, and to generally control operations of the server 700 pursuant to the software instructions. The I/O interfaces 704 may be used to receive user input from and/or for providing system output to one or more devices or components.

The network interface 706 may be used to enable the server 700 to communicate on a network, such as the Internet 604 (FIG. 6). The network interface 706 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 706 may include address, control, and/or data connections to enable appropriate communications on the network. A data store 708 may be used to store data. The data store 708 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 708 may incorporate electronic, magnetic, optical, and/or other types of storage media. In one example, the data store 708 may be located internal to the server 700, such as, for example, an internal hard drive connected to the local interface 712 in the server 700. Additionally, in another embodiment, the data store 708 may be located external to the server 700 such as, for example, an external hard drive connected to the I/O interfaces 704 (e.g., a SCSI or USB connection). In a further embodiment, the data store 708 may be connected to the server 700 through a network, such as, for example, a network-attached file server.

The memory 710 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 710 may incorporate electronic, magnetic, optical, and/or other types of storage media. Note that the memory 710 may have a distributed architecture, where various components are situated remotely from one another but can be accessed by the processor 702. The software in memory 710 may include one or more software programs, each of which includes an ordered listing of executable instructions for implementing logical functions. The software in the memory 710 includes a suitable operating system (O/S) 714 and one or more programs 716. The operating system 714 essentially controls the execution of other computer programs, such as the one or more programs 716, and provides scheduling, input-output control, file and data management, memory management, and communication control and related services. The one or more programs 716 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
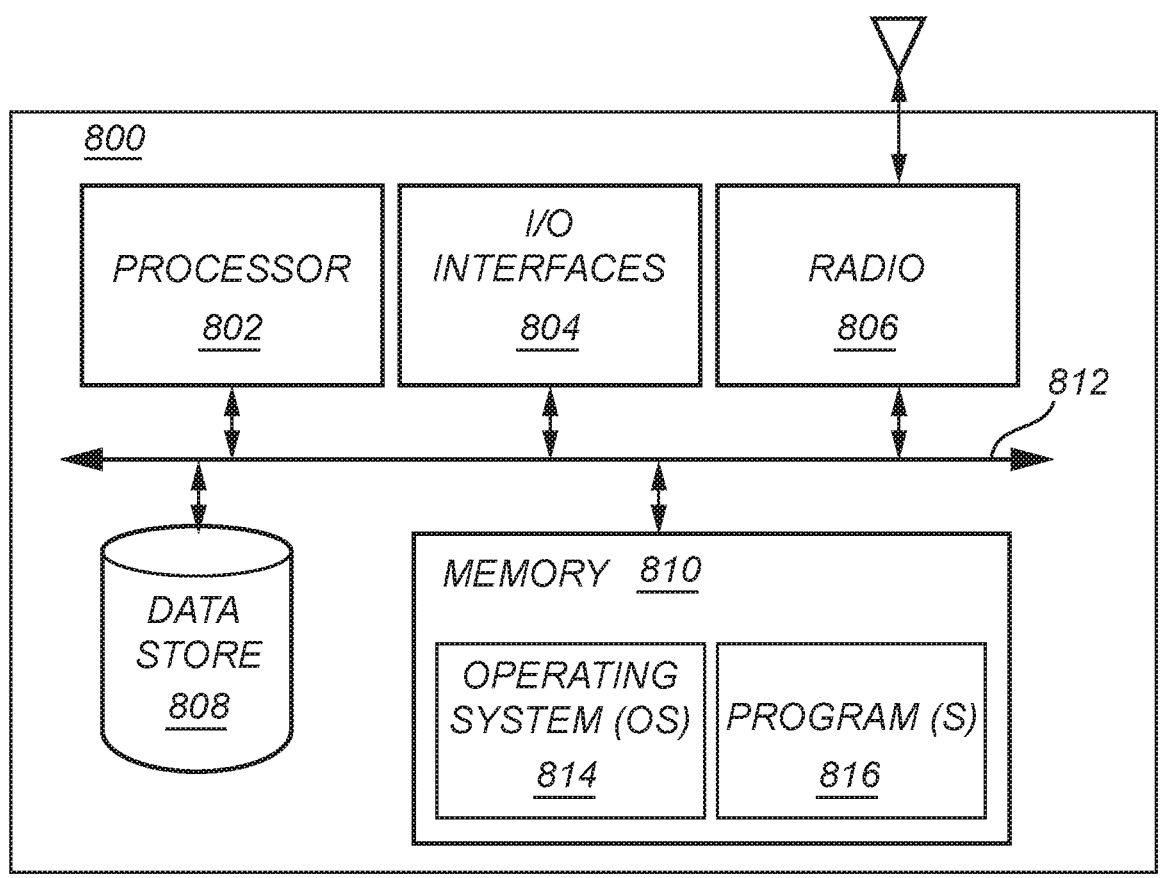
FIG. 8 is a block diagram of a user device which may be used in the cloud-based system of FIG. 6 or stand-alone.

FIG. 8 is a block diagram of a user device 800, which may be used in the cloud-based system 600 (FIG. 6), as part of a network, or stand-alone. Again, the user device 800 can be a vehicle, a smartphone, a tablet, a smartwatch, an Internet of Things (IoT) device, a laptop, a virtual reality (VR) headset, etc. The user device 800 can be a digital device that, in terms of hardware architecture, generally includes a processor 802, I/O interfaces 804, a radio 806, a data store 808, and memory 810. It should be appreciated by those of ordinary skill in the art that FIG. 8 depicts the user device 800 in an oversimplified manner, and a practical embodiment may include additional components and suitably configured processing logic to support known or conventional operating features that are not described in detail herein. The components (802, 804, 806, 808, and 810) are communicatively coupled via a local interface 812. The local interface 812 can be, for example, but is not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The processor 802 is a hardware device for executing software instructions. The processor 802 can be any custom made or commercially available processor, a CPU, an auxiliary processor among several processors associated with the user device 800, a semiconductor-based microprocessor (in the form of a microchip or chipset), or generally any device for executing software instructions. When the user device 800 is in operation, the processor 802 is configured to execute software stored within the memory 810, to communicate data to and from the memory 810, and to generally control operations of the user device 800 pursuant to the software instructions. In an embodiment, the processor 802 may include a mobile optimized processor such as optimized for power consumption and mobile applications. The I/O interfaces 804 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 806 enables wireless communication to an external access device or network. Any number of suitable wireless data communication protocols, techniques, or methodologies can be supported by the radio 806, including any protocols for wireless communication. The data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media.

Again, the memory 810 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 can include one or more software programs, each of which includes an ordered listing of executable instructions for implementing logical functions. In the example of FIG. 8, the software in the memory 810 includes a suitable operating system 814 and programs 816. The operating system 814 essentially controls the execution of other computer programs and provides scheduling, input-output control, file and data management, memory management, and communication control and related services. The programs 816 may include various applications, add-ons, etc. configured to provide end user functionality with the user device 800. For example, example programs 816 may include, but not limited to, a web browser, social networking applications, streaming media applications, games, mapping and location applications, electronic mail applications, financial applications, and the like. In a typical example, the end-user typically uses one or more of the programs 816 along with a network, such as the cloud-based system 600 (FIG. 6).

Again, as alluded to above, contemporary search engines deliver users sets of results based on their queries. A user makes a choice by selecting a result link that redirects them to a domain-specific web page. This query posed to the search engine is captured and the associated journey creates a record representing the user's intent and an understanding of the domain-specific web page. The present disclosure provides three refinements to this process. First, search terms are mapped to domain objects. Second, semantic mappings to the domain ontology are formed. Third, the mapping is used to enable smart inventory searching, such as in a vehicle search and sale context. Data regarding the association/understanding is mined towards the task of classifying domain objects to expose patterns and importance to the query terms. Thus, the solution of the present disclosure creates a subset of the search terms that does not yet exist, enabling enhanced search.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
receiving a search query comprising search terms;
using a machine learning module, selecting features of the search terms and mapping an association between the search terms and a domain object, thereby generating a domain object classification, wherein selecting features of the search terms comprises inputting the search terms into one of a minimum-redundancy, maximum-relevance model and a random forest model to find an optimal combination of words that maximizes classification accuracy;
tagging the domain object with the domain object classification; and
using the domain object tagged with the domain object classification to conduct a subsequent search.

2. The method of claim 1, wherein mapping the association between the search terms and the domain object comprises linking the search terms to the domain object in a pre-defined table.

3. The method of claim 1, wherein tagging the domain object with the domain object classification comprises selecting the features of the search terms to identify an optimal combination of words that maximizes classification accuracy and performing zero-shot learning to generate an automated tag that summarizes the combination of words.

4. The method of claim 1, further comprising, in an off-line mode:
extracting the search terms and building a semantic language model by collecting search query-landing web page pairs over a period of time;
collecting topics from the semantic language model that represent frequently searched topics;
adding new topics and mapping the topics and new topics in the product taxonomy; and
exporting resulting embeddings to a k-nearest neighbor index for fast run-time lookup.

5. The method of claim 4, further comprising, in an on-line mode:

collecting search keywords for a particular user and computing a corresponding query embedding;

looking up semantic nearby topics according to the semantic language model; and exploring the product taxonomy to enrich a query with semantic descriptions.

6. The method of claim 1, wherein conducting the subsequent search comprises:

receiving a subsequent search query comprising subsequent search terms;

tokenizing the subsequent search terms;

finding permutations of the tokenized subsequent search terms;

matching the subsequent search terms to the domain object tagged with the domain object classification; and displaying subsequent search results via a user interface.

7. The method of claim 6, wherein subsequent search terms that match a defined association with the domain object tagged with the domain object classification are included in a search query string to which subsequent search terms that do not match a defined association with the domain object tagged with the domain object classification are appended.

8. A non-transitory computer-readable medium comprising instructions stored in a memory and executed by a processor to carry out the classification, tagging, and search steps comprising:

receiving a search query comprising search terms;

using a machine learning module, selecting features of the search terms and mapping an association between the search terms and a domain object, thereby generating a domain object classification, wherein selecting features of the search terms comprises inputting the search terms into one of a minimum-redundancy, maximum-relevance model and a random forest model to find an optimal combination of words that maximizes classification accuracy;

tagging the domain object with the domain object classification; and using the domain object tagged with the domain object classification to conduct a subsequent search.

9. The non-transitory computer-readable medium of claim 8, wherein mapping the association between the search terms and the domain object comprises linking the search terms to the domain object in a pre-defined table.

10. The non-transitory computer-readable medium of claim 8, wherein tagging the domain object with the domain object classification comprises selecting the features of the search terms to identify an optimal combination of words that maximizes classification accuracy and performing zero-shot learning to generate an automated tag that summarizes the combination of words.

11. The non-transitory computer-readable medium of claim 8, the steps further comprising, in an off-line mode:

extracting the search terms and building a semantic language model by collecting search query-landing web page pairs over a period of time;

collecting topics from the semantic language model that represent frequently searched topics;

adding new topics and mapping the topics and new topics in the product taxonomy; and exporting resulting embeddings to a k-nearest neighbor index for fast run-time lookup.

12. The non-transitory computer-readable medium of claim 11, the steps further comprising, in an on-line mode:

collecting search keywords for a particular user and computing a corresponding query embedding;

looking up semantic nearby topics according to the semantic language model; and exploring the product taxonomy to enrich a query with semantic descriptions.

13. The non-transitory computer-readable medium of claim 8, wherein conducting the subsequent search comprises:

receiving a subsequent search query comprising subsequent search terms;

tokenizing the subsequent search terms;

finding permutations of the tokenized subsequent search terms;

matching the subsequent search terms to the domain object tagged with the domain object classification; and displaying subsequent search results via a user interface.

14. The non-transitory computer-readable medium of claim 13, wherein subsequent search terms that match a defined association with the domain object tagged with the domain object classification are included in a search query string to which subsequent search terms that do not match a defined association with the domain object tagged with the domain object classification are appended.

15. A system, comprising:

memory storing instructions executed by a processor for receiving a search query comprising search terms;

a machine learning module operable for selecting features of the search terms and mapping an association between the search terms and a domain object, thereby generating a domain object classification, and tagging the domain object with the domain object classification, wherein selecting features of the search terms comprises inputting the search terms into one of a minimum-redundancy, maximum-relevance model and a random forest model to find an optimal combination of words that maximizes classification accuracy; and a search engine operable for using the domain object tagged with the domain object classification to conduct a subsequent search.

16. The system of claim 15, wherein conducting the subsequent search comprises:

receiving a subsequent search query comprising subsequent search terms;

tokenizing the subsequent search terms;

finding permutations of the tokenized subsequent search terms;

matching the subsequent search terms to the domain object tagged with the domain object classification; and displaying subsequent search results via a user interface.

17. The system of claim 16, wherein subsequent search terms that match a defined association with the domain object tagged with the domain object classification are included in a search query string to which subsequent search terms that do not match a defined association with the domain object tagged with the domain object classification are appended.

* * * * *